(No Model.) 2 Sheets—Sheet 1.

R. G. SHUTE.
BELL FOR BICYCLES.

No. 310,620. Patented Jan. 13, 1885.

Witnesses
S. N. Piper
Wm. H. Preston

Inventor
Richard Gardner Shute
by R. H. Eddy atty (No Model.) 2 Sheets—Sheet 2.

R. G. SHUTE.
BELL FOR BICYCLES.

No. 310,620. Patented Jan. 13, 1885.

Witnesses
S. N. Piper
Wm H. Preston

Inventor
Richard Gardner Shute,
by R. H. Eddy atty.

UNITED STATES PATENT OFFICE.

RICHARD G. SHUTE, OF EDGARTOWN, MASSACHUSETTS.

BELL FOR BICYCLES.

SPECIFICATION forming part of Letters Patent No. 310,620, dated January 13, 1885.

Application filed July 21, 1884. (No model.)

*To all whom it may concern:*

Be it known that I, RICHARD GARDNER SHUTE, of Edgartown, in the county of Dukes, of the Commonwealth of Massachusetts, have invented a new and useful Improvement in Bicycle-Alarms; and I do hereby declare the same to be described in the following specification and represented in the accompanying drawings, of which—

Figure 1:
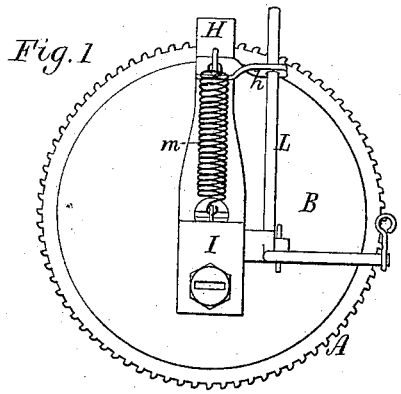
Figure 2:
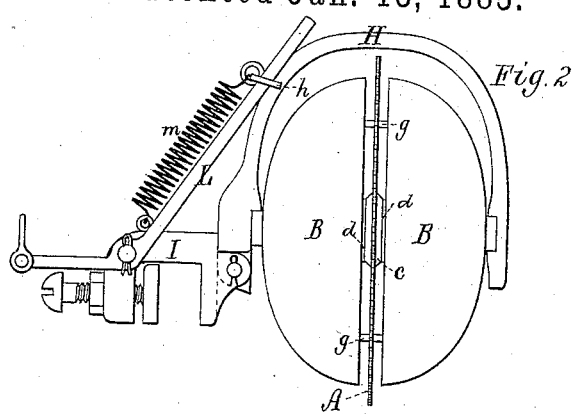
Figure 4:
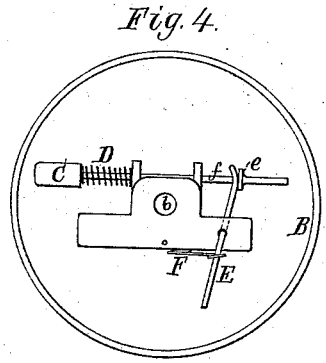
Figure 3:
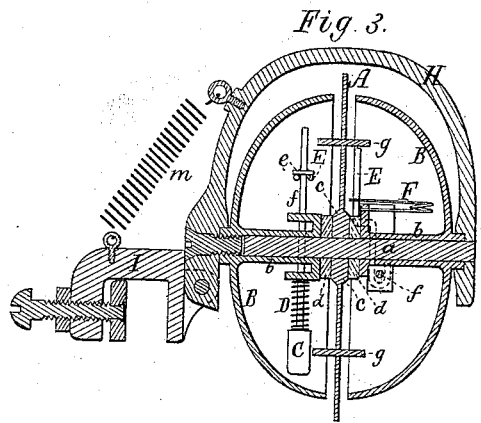
Figure 8:
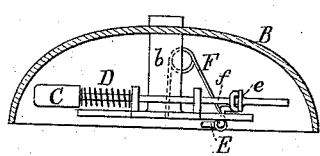
Figure 7:
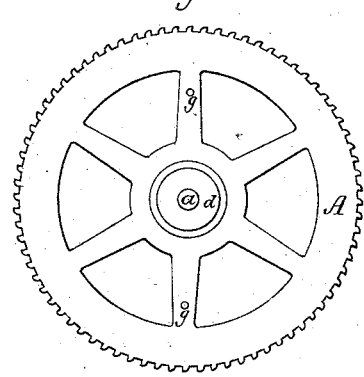
Figure 5:
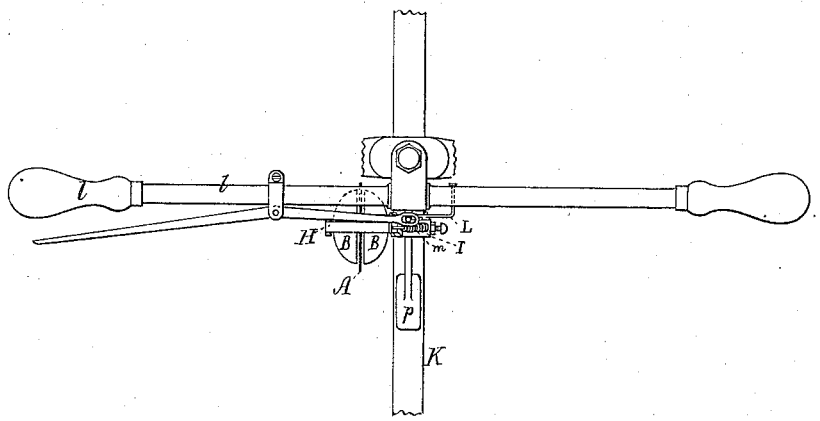
Figure 6:
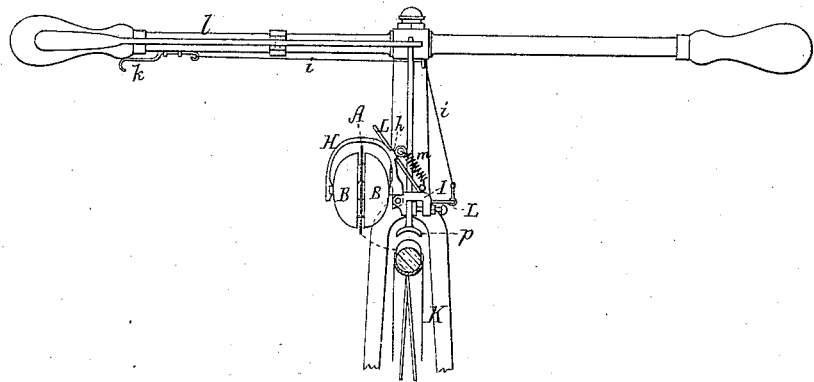

Figure 1 is a side elevation, Fig. 2 an end view, and Fig. 3 a longitudinal section, of an alarm of my improved kind. Fig. 4 is an inner side view of one of the bells with its striking mechanism. Fig. 5 is a top view, and Fig. 6 an end view, of the alarm as applied to the brake and steering part of a bicycle. Fig. 7 is a side view of the operative wheel of the bell-striking mechanism. Fig. 8 is a transverse section of one of the bells, showing in top view its striking mechanism.

The nature of my invention is defined in the claims hereinafter presented.

The apparatus is to enable a wheelman to sound an alarm while he may be riding a bicycle, such alarm being to give notice to others of the approach of the vehicle. In order to accomplish this the wheelman, while hold of the handles of the steering mechanism, is to move by the thumb of one hand a slide, in order to cause the alarm apparatus to be turned downward, to carry the toothed periphery of its operative wheel into contact with the rim or elastic tire of the main or larger wheel of the vehicle. The larger wheel, revolving against the said toothed periphery of the said operative wheel, will put the operative wheel in revolution, whereby the alarm will be sounded. The said operative wheel is shown at A as having a toothed periphery, and extended between two gong-bells, B B, and having its axle $a$ journaled in bearings $b\,b$, projecting inwardly from the bells. The wheel A has a diameter larger than that of each of the bells, and therefore projects from them. Between and against the hub $c$ of the wheel and each of the bearings $b$ is a friction-washer, $d$, to prevent the wheel A from accidentally revolving. Within each bell, and supported so as to slide rectilinearly therein, is a striker, C, provided with a spiral spring, D, for moving it against the bell, and another, F, for drawing it back out of contact therewith after each blow of it on the bell. There is also fulcrumed within the bell a lever, E, whose upper arm (see Fig. 4) rests against a shoulder, $e$, on the rod $f$ of the striker C. The spring F is represented as connected with the lower arm of the lever E, it being particularly shown in Fig. 8. The wheel has a stud or studs, $g$, projecting from one or each side of it, two of them in the drawings being shown to each side of it, they being arranged so as while the wheel may be in revolution each of them on one side of it shall be moved around with the wheel and against and by the next adjacent lever E of the striking mechanism, so as to move such lever in a manner to cause the striker of the mechanism to be retracted against its spiral spring, the latter to be contracted longitudinally and the lever to be set free, so as to allow the spring to impel the striker against the bell to sound it. The bell or bells are arranged within and supported by a yoke, H, hinged to a screw-clamp, I, such clamp being for attaching the yoke to the brake $p$ of a bicycle, K. (See Figs. 5 and 6.) A bent lever, L, fulcrumed to the clamp, has its longer arm extending loosely through an eye, $h$, projecting from the yoke. The shorter arm of the lever, by means of a wire, $i$, is connected to a slide, $k$, applied to one of the steering-handles $l$ of the bicycle, and within reach of the thumb of a wheelman when his hand may be hold of such handle. The slide is to be movable lengthwise by the thumb, so as when so moved such slide shall cause the wire to move the lever in a manner to turn the alarm apparatus downward and force its actuating-wheel into contact with the rim or tire of the bicycle's larger wheel. A spiral spring, $m$, attached to the yoke and to the clamp, will, when the apparatus is being so moved, be stretched lengthwise. On the wheelman removing his thumb from the slide, such spring will operate to raise the alarm apparatus out of contact with the rim or elastic tire of the wheel.

It will be evident that, instead of two gong-bells, one such bell only, with its striking mechanism, may be used with the actuating toothed wheel. For several reasons it is preferable to have two such bells, arranged with the said wheel as described, and also to have their striking mechanism arranged so that they may be acted on alternately by the studs of the actuating-wheel.

I claim—

1. The combination of the screw-clamp and the yoke hinged thereto with an alarm-bell, its striking mechanism, and the operative wheel of the latter arranged within such yoke, all being substantially as set forth.

2. The combination of the screw-clamp and a yoke hinged thereto with two bells arranged within and supported by such yoke, and having a striking mechanism to each, and an operative wheel to both, disposed between such bells, such wheel having a diameter larger than that of the bells, and all being substantially as set forth.

3. The combination of the screw-clamp and a yoke hinged thereto, and provided with an alarm apparatus having an actuating-wheel, as described, with a lever fulcrumed to the clamp and extended through an eye of the yoke, and with a retractive spring connected with the yoke and the clamp, such lever being for depressing the yoke and its alarm mechanism, and such spring being for subsequently raising them, all essentially as represented.

RICHARD G. SHUTE.

Witnesses:
JOSEPH T. PEASE,
HARRY L. WIMPENNEY.